United States Patent Office 3,100,176
Patented Aug. 6, 1963

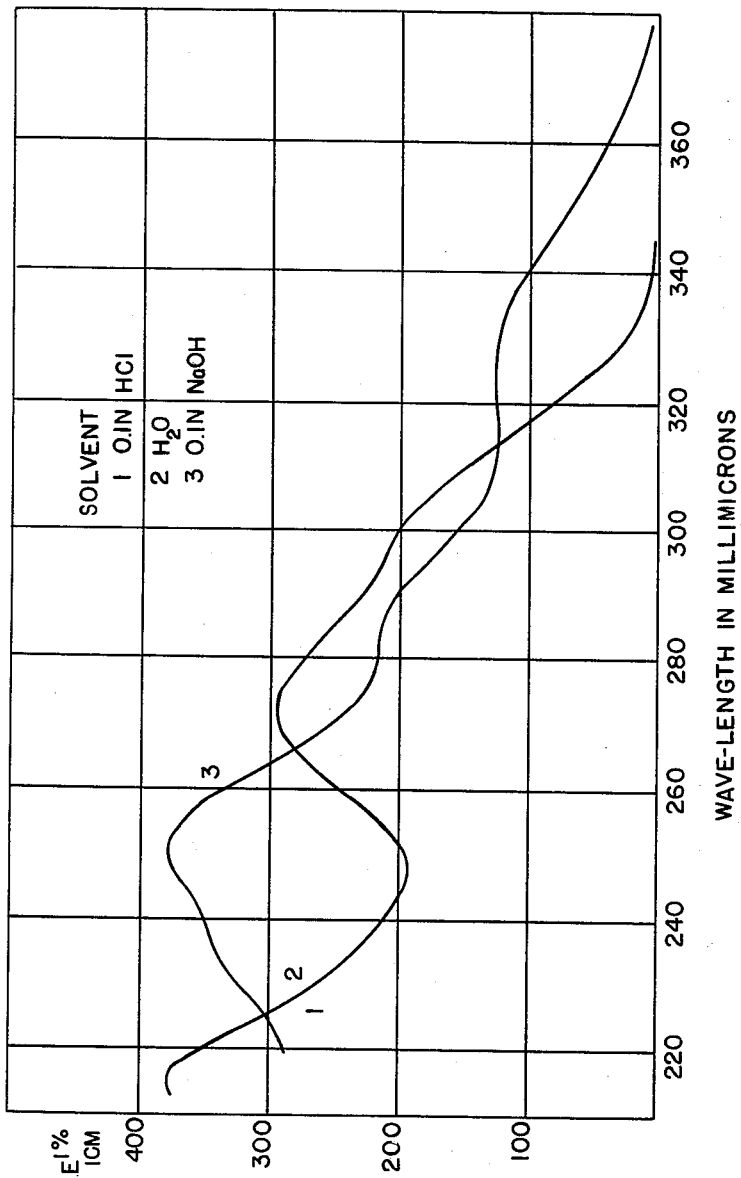

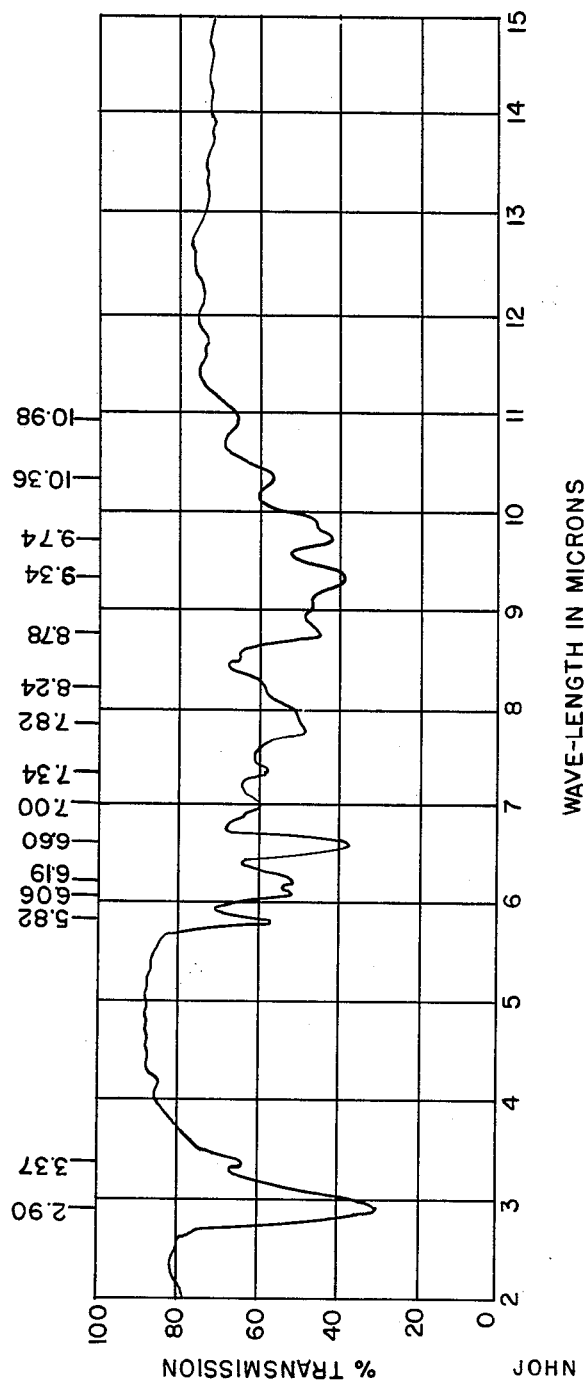

3,100,176
HYGROMYCIN AND METHOD OF PRODUCING SAME
John Ehrlich, Grosse Pointe Park, Quentin R. Bartz, Detroit, and Mildred Penner Knudsen, Birmingham, Mich., assignors to Parke, Davis & Company, Detroit, Mich., a corporation of Michigan
Filed Sept. 9, 1954, Ser. No. 455,012
8 Claims. (Cl. 167—65)

This invention relates to a new chemical compound having valuable antibiotic properties and to a method for its production. More particularly, the invention relates to a new antibiotic which has been given the name hygromycin.

Hygromycin is a stable amorphous white material which is very soluble in water, methanol and ethanol and relatively insoluble in the less polar organic solvents. Hygromycin is acidic in nature and forms salts with basic materials; it is relatively stable in the presence of water and acids but unstable in the presence of bases. Hygromycin is optically active, having an optical rotation, $[\alpha]_D^{24}$, of about $-126°$ (c.=1% in water). The ultraviolet absorption spectra of hygromycin in water and in 0.1 N hydrochloric acid have characteristic maxima at wave-lengths of 216 and 273 millimicrons, a characteristic minimum at 247–248 millimicrons and an inflection at 302 millimicrons. In 0.1 N sodium hydroxide solution there are characteristic maxima at 250.5 and 323 millimicrons and an inflection at about 285 millimicrons. These absorption spectra for hygromycin are represented in FIGURE 1.

The infrared spectrum of hygromycin (represented in FIGURE 2) using the potassium bromide wafer technique is characterized by pronounced absorption peaks at wave-lengths of 2.90, 3.37, 5.82, 6.06, 6.19, 6.60, 7.00, 7.34, 7.82, 8.24, 8.78, 9.34, 9.74, 10.36 and 10.98 microns.

Hygromycin contains only the elements carbon, hydrogen, oxygen and nitrogen, and has a pKa, as shown by electrometric titration in water, of about 8.9. For phenol and enol groups, hygromycin gives a positive reaction with Folin-Ciocalteu reagent and a negative reaction with ferric chloride. Hygromycin reduces Benedict's solution and Fehling's solution but fails to react in the anthrone, Molisch and maltol tests for carbohydrate. The R$f$ values of hygromycin in different solvent systems at 20–25° C. using ascending technique, are as follows:

TABLE 1

Solvent system (parts by volume):      R$f$ (approximate)
- t-Butanol (4), acetic acid (1), water (1)_____ 0.50
- t-Butanol (2), acetic acid (1), water (1)_____ 0.69
- t-Amyl alcohol (12), acetone (5), water (15)_____ 0.77
- Isopropyl alcohol (7), water (3)_____ 0.80
- n-Butanol (3), pyridine (1), water (1)_____ 0.56

Hygromycin possesses a high order of activity (i.e., of the order of streptomycin) against certain acid-fast bacteria, notably virulent strains of Mycobacterium tuberculosis var. hominis, the causative agent for the disease tuberculosis. Hygromycin is also strongly active against gram-positive bacteria as well as certain gram-negative bacteria. Example of these disease-producing gram-positive bacteria are Diplococcus pneumoniae and Streptococcus pyogenes. Among the gram-negative bacteria against which hygromycin exhibits bacteriostatic action are Vibrio comma, Brucella suis, and Escherichia coli. Table 2 illustrates the unique antibiotic spectrum of hygromycin and shows the concentration of hygromycin affording complete inhibition.

TABLE 2
Antibacterial Activity of Hygromycin

| Organism | Medium | Period (days) | Concentration for complete inhibition (micrograms per ml.) |
|---|---|---|---|
| Clostridium perfringens | Thioglycollate broth. | 1 | 3.13 |
| Corynebacterium diphtheriae | TSB[1] plus serum | 1 | 6.25 |
| Diplococcus pneumoniae | TSB plus serum | 1 | 3.13 |
| Micrococcus pyogenes var. aureus. | TSB | 1 | 25.0 |
| Sarcina lutea | TSB | 2 | 12.5 |
| Streptococcus pyogenes | TSB plus serum | 1 | 6.25 |
| Streptococcus salivarius | do | 1 | 12.5 |
| Bacillus cereus | TSB | 1 | 1.56 |
| Lactobacillus leichmannii | MIB[2] | 0.75 | 6.25 |
| Leuconostoc mesenteroides | MIB | 0.75 | [3] >100.0 |
| Aerobacter aerogenes | TSB | 1 | 25.0 |
| Brucella suis | TSB plus serum | 2 | 3.13 |
| Escherichia coli | TSB | 1 | 12.5 |
| Klebsiella pneumoniae | TSB | 1 | >100.0 |
| Pasteurella multocida | TSB plus serum | 1 | 3.13 |
| Proteus vulgaris | TSB | 1 | >100.0 |
| Pseudomonas aeruginosa | TSB | 1 | >100.0 |
| Salmonella paratyphi | TSB | 1 | >100.0 |
| Salmonella schottmuelleri | TSB | 1 | >100.0 |
| Salmonella typhosa | TSB | 1 | 100.0 |
| Shigella dysenteriae | TSB | 1 | 25.0 |
| Vibrio comma | TSB | 1 | 6.25 |
| Mycobacterium phlei | TSB | 2 | 50.0 |
| Mycobacterium tuberculosis var. hominis. | Synthetic[4] | 5 | 1.56 |
| Mycobacterium tuberculosis var. hominis. | Synthetic plus serum. | 5 | 3.13 |

[1] Trypticase soy broth (B-B-L).
[2] Micro inoculum broth (Bacto).
[3] Almost complete inhibition.
[4] Fisher, Am. Rev. Tuberc. 69: 797, 1954.

In general, hygromycin appears to be a relatively non-toxic substance. For example, it has been determined that for a single intravenous injection of a hygromycin preparation in mice the LD$_{50}$ is greater than 800 mg./kg. and the maximum tolerated dose, 700 mg./kg. For a single sub-cutaneous injection, the LD$_{50}$ and M.T.D. are greater than 1000 mg./kg. Doses as great as 600 mg./kg./day in mice have been tolerated for ten days without any deaths or local tissue injury and without significant effect on the rate of weight gain.

The product of the invention, hygromycin, may be prepared from cultures of an actinomycete which is designated herein as Streptomyces atrofaciens. This organism occurs in soils and useful strains of the organism have been isolated from various soils. A preferred strain was isolated from an Ecuadorean soil. When the organism is grown on glucose-trypone-agar medium, the moist young primary mycelium appear colorless to grey, occasionally slightly purple, later becoming black. The aerial secondary mycelium is at first white, becoming pink to greyish pink or lavender. The aerial mycelium is irregularly branched; the hyphae are long, straight, or wavy with occasional irregularly formed short compact spirals. The distal portions of the aerial hyphae subdivide into chains of unicellular hyaline conidia. A dark brown or black pigment appears in most complex organic media and some synthetic media. The organism hydrolyzes milk and gelatin slowly, and utilizes arabinose, cellobiose, glucose, galactose, glycerol, inositol, lactose, mannose, raffinose, starch and xylose but does not utilize dulcitol, inulin, rhamnose, sorbitol or sucrose.

Cultures of Streptomyces atrofaciens may be obtained by diluting soil samples containing the microorganism with sterile water, decanting the water, plating out in serial dilutions on nutrient agar plates, and incubating the resulting culture at 26° C. The Streptomyces atrofaciens growths are selected and transferred to fresh nutrient agar plates. After several such transfers, pure cultures of

*Streptomyces atrofaciens* are obtained. A culture of *Streptomyces atrofaciens* is being maintained in the permanent collection of Parke, Davis & Company Culture Bureau under No. O4992. A culture of *Streptomyces atrofaciens* has been deposited with the United States Department of Agriculture, Culture Collection group, Fermentation Section, Northern Utilization Research Branch, Peoria, Illinois, and is being maintained in their permanent collection of microorganisms as culture number NRRL 2429. For simplicity in the following description and claims this culture will be referred to as *Streptomyces atrofaciens*.

Table 3 which follows serves to distinguish *Streptomyces atrofaciens* from other antibiotic-producing actinomycetes on the basis of ability to utilize various carbon sources when grown on a medium of agar, inorganic salts and the carbon source under test.

mum production occurs in about 90 hours. Longer incubation periods do not appear to decrease the amount of hygromycin present in the culture liquid. When shaken flasks are used for the incubation, the time of maximum production may be slightly higher than that required for large scale fermentation vats. Under submerged culture conditions, the organism develops as more or less discrete particles dispersed throughout the nutrient medium in contrast to the more or less continuous pellicle present on the surface of the medium in the surface culture method. By virtue of this distribution of the organism throughout the medium, large volumes of inoculated nutrient medium can be cultivated at one time in the large tanks and vats customarily employed in the fermentation industry. Stationary vat fermenters equipped with suitable agitation and aeration devices, as well as horizontal rotary drum fermenters, have been found to be particularly useful in

TABLE 3

*Carbohydrate utilization by S. atrofaciens and other antibiotic species of Streptomyces grown on synthetic agar medium* [1]

[Growth: 0 = none, + = poor, ++ = fair, +++ = good, ++++ = very heavy]

| Species of streptomyces | Carbon source | | | | | | |
| --- | --- | --- | --- | --- | --- | --- | --- |
| | l-Arabinose | i-Inositol | Inulin | Maltose | Raffinose | Rhamnose | d-Sorbitol |
| S. atrofaciens | ++ to +++ | + to +++ | 0 | + to +++ | + to ++++ | 0 | 0. |
| S. aureofaciens | ++++ | 0 | 0 | +++ | 0 | 0 | 0. |
| S. floridae | 0 to ++ | 0 | 0 to + | ++++ | 0 | 0 | 0 to +. |
| S. fradiae | ++++ | 0 | 0 to + | + to +++ | 0 | 0 | 0 to sl. +. |
| S. griseus | 0 to sl. + | 0 | 0 to sl. + | ++++ | 0 | 0 | 0 to sl. +. |
| S. hygroscopicus | ++ to ++++ | 0 | 0 | ++++ | ++ to +++ | +++ to ++++ | 0. |
| S. lavendulae | 0 to ++++ | 0 | 0 to sl. + | ++++ | 0 | 0 to + | 0. |
| S. venezuelae | ++++ | 0 | 0 | ++++ | 0 | ++++ | 0. |

[1] Pridham et al., J. Bact. 56: 108, 1948.

In accordance with the invention, hygromycin is produced by inoculating a suitable sterile aqueous nutrient medium with *Streptomyces atrofaciens*, incubating the resulting mixture under aerobic conditions at a temperature between 20–35° C. for a period of about one to eight days, preferably, about three to six days, and then isolating hygromycin from the culture medium. The cultivation of *Streptomyces atrofaciens* can be carried out in a number of different ways. For example, the microorganisms can be cultivated under aerobic conditions on the surface of the medium or it can be cultivated beneath the surface of the medium, that is in submerged condition, if oxygen is simultaneously supplied.

The production of hygromycin by the surface culture method involves inoculating a shallow layer, usually less than 2 cm., of a sterile, aqueous nutrient medium with *Streptomyces atrofaciens* and incubating the mixture under aerobic conditions at a temperature between about 20–35° C., preferably in the neighborhood of 23–28° C. for a period of about one to eight days. For inoculation, spores or conidia of *Streptomyces atrofaciens* as well as aqueous suspensions of the same containing a small amount of soap or other wetting agent may be used.

The preferred method for producing hygromycin on a large scale involves the use of submerged or deep cultures of *Streptomyces atrofaciens*. According to this embodiment of the invention, a sterile aqueous nutrient medium is inoculated with *Streptomyces atrofaciens* (spores, or preferably a vigorous, young vegetative culture) and incubated with agitation and aeration at a temperature between about 20–35° C., preferably in the neighborhood of 23–28° C. The length of time required for the production of hygromycin and the yield vary with inoculum, composition of the nutrient medium, environmental conditions, and the type and size of equipment used. For example, in a large scale fermentation, such as carried out in a tank-type fermenter, maximum production of hygromycin is reached in about three to six days. Optimum production occurs in about 90 hours. Longer incubation periods do not appear to decrease the amount of hygromycin present in the culture liquid. When shaken this respect. However, for the preparation of smaller quantities of the antibiotic or of cultures of the microorganism, this submerged culture method may be carried out in small flasks or jars which may be either shaken or stirred by suitable mechanical means.

Agitation and aeration of the culture mixture may be accomplished in a number of ways. Agitation may be provided by turbines, paddles, impellers or other mechanical agitation devices, by revolving or shaking the fermenter itself, by various pumping devices or by the passage of air or other oxygen-containing gases through the medium. Aeration may be effected by injecting air or other oxygen-containing gases into the fermentation mixture through open pipes, perforated pipes, porous diffusion media such as carbon stocks, Carborundum, sintered glass and the like, or it may be provided by spraying, splashing, or spilling the mash into or through an oxygen-containing atmosphere.

A relatively wide variety of nutrient media may be used in the growing stage of the process. However, it has been found that the best results are obtained by employing a nutrient medium containing as assimilable carbon source, proteinaceous material and a mineral source.

"Assimilable carbon source" is here understood to include polyhydric alcohols and mono-, di- and poly-saccharides while the term "proteinaceous material" includes unmodified protein and protein degradation products, particularly such products as arise from the hydrolysis of proteins. These protein degradation products include proteases, peptones, polypeptides, peptides and amino acids. As stated, the medium should also contain minerals. Some specific examples of such mineral constituents are sodium chloride, potassium chloride, calcium carbonate, sodium carbonate, sodium bicarbonate, sodium acetate, sodium citrate, sodium succinate, disodium phosphate, sodium dihydrogen phosphate, dipotassium phosphate, potassium dihydrogen phosphate, ferric tartrate, copper sulfate and magnesium sulfate.

As assimilable carbon sources glucose monohydrate, d-galactose, glycerol, lactose, maltose, starch, l-arabinose, i-inositol, raffinose, dextrin, dextrose, d-fructose and d-galactose may be mentioned. The carbon source may be supplied to the medium in purified form or in the form of concentrates. Thus, starch may be supplied as unmodified starch, or it may be subjected to the action of acid or liquifying enzymes in the course of the preparation of the medium. Glucose, being one of the normal components of corn steep liquor or of the dried solids thereof, may be supplied in this form or as the purified sugar or corn syrup. Grain mashes, such as corn, wheat or barley mash, either malted or unmalted, may also be used. Such mashes are particularly suitable because they provide at a low cost not only starch and dextrins, but also an appreciable quantity of minerals, growth factors and proteinaceous materials which are favorable to the production of antibiotics. Some of the grain mashes, as well as some whey concentrates, are sufficiently rich in protein to make it unnecessary to add other proteinaceous material to the medium. The quantity of assimilable carbon present in the nutrient medium is not particularly critical and can be varied considerably. The preferred quantity of assimilable carbon is from 0.5 to 3% by weight (as carbohydrate) of the total weight of the medium.

A wide variety of proteinaceous material may be used in the medium. For example, acid-hydrolyzed casein, enzyme-hydrolyzed casein, distillers grain slops, dried distillers solubles, corn-steep liquor, wheat-steep liquor, whey or whey concentrates, soybean oil meal, acid-hydrolyzed corn gluten, acid-hydrolyzed wheat gluten, fish meal, meat extracts, peanut meal, peptone, offals, brewers yeast, inorganic nitrates, urea, ammonium salts and the like as well as synthetic mixtures of numerous amino acids may be used. These proteinaceous materials need not be supplied in a high degree of purity as the less materials which carry traces of growth factors and considerable quantities of mineral nutrients are suitable for use. The quantity of proteinaceous materials present in the nutrient medium may be varied widely but for practical purposes need not exceed 5% by weight of the total weight of the medium.

A source of minerals is required in the nutrient medium to provide the best yields of hygromycin. In general, many crude carbon sources and proteinaceous materials such as corn steep liquor, butanol-acetone fermentation residues, yeast preparations, soybean oil meal and the like, contain minerals in sufficient amounts. However, in order to insure the presence of adequate amounts of minerals, it is usually advantageous to add mineral salts to the nutrient medium.

In order to insure the desired production of hygromycin the pH of the nutrient medium should be in general be maintained within the range of 6 to 9 and preferably within the range of 6.8 to 8.2. A starting pH of about 7 to 7.2 has been found to be optimal for favoring rapid production of hygromycin and hence is the preferred starting pH range.

The isolation of hygromycin from the culture medium can be accomplished in a number of different ways. One of such methods involves filtering the liquid culture medium, extracting the filtrate with a water-immiscible alcohol such as n-butanol, n-amyl alcohol, isobutanol, t-amyl alcohol and the like, distilling off most of the alcohol from the extract under reduced pressure and subjecting the residual material to further purification by adsorption and elution methods. In particular, after removal of alcohol, the residue is taken up in water, the pH is adjusted to 2.8 to 3.5 and the solution is adsorbed on a column containing charcoal and filter-aid, preferably of a diatomaceous earth type. The column is washed first with dilute acid at about pH 3 and then with dilute acetone or similar solvent. Hygromycin is eluted from the column with either 75% aqueous acetone or a solution containing 60% water, 30% acetone, and 10% butanol. The solvents are then removed from the eluate and the residual material dissolved in a low boiling point alcohol and precipitated by the addition of a low boiling point petroleum ether.

Hygromycin which has been subjected to adsorption and elution can be further purified by the selective extraction method commonly known as the Craig countercurrent extraction method (detailed directions are described in "Technique of Organic Chemistry," vol. III, especially pages 285–287, Interscience Publishers, New York, 1950). This method employs a solvent mixture composed of a water-immiscible organic solvent, a water-miscible organic solvent and water. The preferred solvent system for this purpose is 4 parts n-butanol, 0.15 part acetic acid, and 4 parts water; one phase being butanol equilibrated with acetic acid and water, and the other phase being water equilibrated with butanol and acetic acid.

The invention is illustrated by the following examples:

EXAMPLE 1

(a) A mixture consisting of 35 g. each of glycerol, sodium chloride and glucose monohydrate, 21 g. of acid-hydrolyzed casein, 17.5 g. each of peptone, debittered brewers yeast, soybean meal, corn steep solids and butanol-acetone fermenation residue, and sufficient water to bring the volume to 90 liters is placed in 18 liter quantities in each of five 30-liter stainless-steel-fitted glass seed fermenters. 24% sodium carbonate solution sufficient to bring the pH to 7.5 and calcium carbonate (0.1% by weight) are then added to each of the five fermenters. The resulting mixtures are sterilized by heating at 250° C. for 120 minutes. The pH of the mixtures after sterilization is approximately 7.09. Each fermenter is inoculated with a 10 ml. spore suspension from 13-day old curtures of *Streptomyces atrofaceins*.

The suspensions for this inoculation are obtained by inoculating agar slants of Anderson's sporulation agar medium [described by Ehrlich et al. in "Antibiotics and Chemotherapy," vol. 3, page 1142 (1953)], with lyophilized spores of *Streptomyces atrofaciens*, incubating the agar slants at 28° C. for 13 days, and suspending the spores from five slants in 50 ml. of sterile 0.01% castile soap solution.

The inoculated mixture in each of the fermenters is incubated at 25° C. with sterile aeration through asparger at one volume of air per volume of mixture per minute, and agitated with a turbine-type impeller at 200 r.p.m. for 112 hours.

During the incubation period, the changing antibiotic activity of the fermentation mixture is observed from time to time by separating small samples from the beer mixture and, after clarification of the beer sample, determining the dilution necessary to obtain 50% inhibition of the growth of *Aerobacter aerogenes*. The following table is representative of the results obtained by such tests.

| Length of incubation period (hours): | Dilution corresponding to 50% inhibition of Aerobacter aerogenes |
|---|---|
| 0 | 0 |
| 16 | 0 |
| 23 | 0 |
| 40 | 1:21 |
| 64 | 1:50 |
| 71 | 1:108 |
| 88 | 1:150 |
| 95 | 1:84 |
| 112 | 1:128 |

Following incubation the broths from the five fermenters are pooled, 487 g. of diatomaceous earth is added, and the resulting slurry is filtered. The filter cake is washed with water and the washings combined with the main filtrate. The combined filtrate and washings (volume: 46.2 l.; pH: 7.02) are extracted with six quarter-volumes of n-butanol. The butanol extracts are combined and concentrated in vacuo in a circulating still below 40° C. to approximately one liter. The residual butanol solution is removed, care being taken to dissolve any of the solid material which clings to the side of the still. The concentrated butanol suspension is filtered and the filter cake is dissolved in water, and the solution is frozen and dried. The resulting hygromycin is a greyish-brown water soluble powder weighing 19.754 g. This product has an ultraviolet absorption spectrum in 0.01 N hydrochloric acid which shows a maximum at a wavelength of 271 millimicrons (see FIGURE 1). It inhibits 50% of the growth of Aerobacter aerogenes and 100% of the growth of Mycobacterium tuberculosis var. hominis (H37–RV) at concentrations of about 14 and 6 micrograms per ml, respectively.

(b) The solid hygromycin product of (a) can be further purified by adsorption and elution from a column as follows:

A mixture of 15 g. of activated charcoal (Darco G60) and 15 g. of diatomaceous earth is slurried in water and poured into a column (25 mm. x 60 cm.). A solution of 0.58 g. of the hygromycin product of (a) in 25 ml. of water is adjusted to pH 5 with 3 N acetic acid and added to the column. The column is then washed with 200 ml. of water and 275 ml. of 25% aqueous acetone. Hygromycin is then eluted from the column with 950 ml. of 75% aqueous acetone. The main fraction consisting of 250 ml. of eluate is diluted with an equal volume of n-butanol. The solution is concentrated in vacuo and the final traces of water are removed by azeotropic distillation; in the final phase of distillation, additional butanol is added. The resulting n-butanol solution of hygromycin is concentrated to 10 ml. The concentrate is centrifuged and the supernatant is diluted with 40 ml. of a low boiling point petroleum ether. The resulting white flocculent precipitate is washed two times with 10 ml. portions of petroleum ether and dried in vacuo. The resulting hygromycin has an ultraviolet absorption spectrum in water and in 0.1 N hydrochloric acid which show maxima at wave-lengths of 216 and 273 millimicrons. It causes 50% inhibition of the growth of Aerobacter aerogenes at a concentration of 4 micrograms per ml.

(c) The solid product of (a) can also be purified in the following manner.

A mixture of 90 g. of activated charcoal (Darco G60) and 90 g. of a diatomaceous earth is slurried. The pH is adjusted to 3 with dilute sulfuric acid and the slurry is poured into a 6 cm. x 150 cm. column. The column is washed with 3 liters of water acidulated to pH 3 with sulfuric acid. 3 g. of the solid hygromycin product of (a) is dissolved in 90 ml. of dilute sulfuric acid (pH 3) and the solution is added to the column.

The column is then washed successively with 725 ml. of dilute sulfuric acid (pH 3) and 1000 ml. of 30% aqueous acetone. 4500 ml. of an aqueous solution containing 60% water, 30% acetone, and 10% butanol is then allowed to percolate through the column. After the addition of about one hold-up volume of this solvent, the eluate is collected. The water is taken off by vacuum distillation and the butanol fraction is dried by azeotropic distillation by the addition of fresh butanol until approximately 100 ml. of solution is obtained. This concentrate is centrifuged to remove the inert material. The supernatant is diluted with 400 ml. of low boiling petroleum ether and the white flocculent precipitate is removed by centrifuging and is washed three times with 30 ml. of petroleum ether and dried in vacuo. The resulting hygromycin product has characteristic ultraviolet absorption spectra in water and in 0.1 N hydrochloric acid which show maxima at wave-lengths of 216 and 273 millimicrons. In 0.1 N sodium hydroxide solution there are maxima at 250.5 and 323 millimicrons. The product affords 50% inhibition of the growth of Aerobacter aerogenes at a concentration of about 8 micrograms per ml.

(d) The product of (c) can be further purified if desired, by counter-current solvent extraction employing apparatus of the Craig type. For this purpose the solvent system is prepared by equilibrating 4 liters of distilled water, 4 liters of n-butanol and 150 ml. of glacial acetic acid in an apparatus having 24 plates. The distribution of solvent is approximately 100 ml. per phase. 502.1 mg. of the product of (c) is processed in the first tube and passed to successive tubes until equilibrium is reached. Each tube is then analyzed spectrophotometrically to determine the presence of hygromycin. The contents of the tubes found to contain the major portion of hygromycin (usually the 12th, 13th and 14th tubes) are then combined, concentrated in vacuo and dried from the frozen state. The solid hygromycin thus obtained can be further purified if desired by a second extraction employing a 24-plate Craig counter-current extracter having a capacity of 10 ml. per phase When equilibrium is reached, the tube containing the major portion of hygromycin (usually the 12th tube) as determined by spectrophotometric analysis is selected and the hygromycin is isolated from the solvent by concentrating in vacuo and drying the aqueous solution from the frozen state. The product, which is essentially pure hygromycin, has ultraviolet absorption spectra in water and in 0.1 hydrochloric acid which show characteristic maxima at wave-lengths of 216 and 273 millimicrons, a characteristic minimum at 247–248 millimicrons and an inflection at 302 millimicrons. In 0.1 N sodium hydroxide solution there are characteristic maxima at 250.5 and 323 millimicrons and an inflection at about 285 millimicrons. The infrared spectrum of the product using the potassium bromide wafer technique shows pronounced absorption peaks at 2.90, 3.37, 5.82, 6.06, 6.19, 6.60, 7.00, 7.34, 7.82, 8.24, 8.78, 9.34, 9.74, 10.36 and 10.98 microns. Microbiological assay shows that the product causes 50% inhibition of the growth of Aerobacter aerogenes at a concentration of 2.6 micrograms per ml. and total inhibition of the growth of Mycobacterium tuberculosis var. hominis (H37–RV) at a concentration of 0.625 microgram per ml. Analysis of one such product of (d) shows 53.26% carbon, 5.81% hydrogen and 3.26% nitrogen for hygromycin, and in another case, an optical rotation of $[\alpha]_D^{24}$, of about −126° (c.=1% in water).

Based on the molecular weight 536±25 for hygromycin reported in Antibiotics Annual, 1953–1954, page 168, Medical Encyclopedia, Inc., N.Y.C. (1953), the empirical formula for hygromycin is $C_{23-25}H_{29-33}NO_{12-13}$.

EXAMPLE 2

300 ml. of the following nutrient medium is prepared:

| | Percent (w./v.) |
|---|---|
| Glucose monohydrate | 0.5 |
| Glycerol | 0.5 |
| Acid hydrolyzed casein | 0.3 |
| Peptone | 0.25 |
| Brewers' yeast | 0.1 |
| Butanol-acetone germentation residue | 0.25 |
| Corn steep solids | 0.25 |
| Soybean oil expeller meal | 0.25 |
| Sodium chloride | 0.5 |
| Calcium carbonate | 0.1 |
| Water to make 300 ml. | |

The medium is placed in a 1000 ml. wide-mouth Erlenmeyer flask, capped with a gauze-covered cotton pad and sterilized with steam at 18 pounds pressure for 25 minutes. The post-sterilization pH is approximately 6.2–6.3. The sterile nutrient medium is inoculated with 1 ml. of a spore suspension obtained by suspending the spores from a sporulated Waksman's glucose-tryptone agar slant of Streptomyces atrofaciens, in 9 ml. of 0.01% sterile castile soap solution. The inoculated culture is incubated at 22–24° for 90 hours with aeration and agitation supplied by a Gump rotary shaker at 160 r.p.m. At 90 hours the pH is approximately 7.9. 32-fold dilution of the clarified beer gives complete inhibition of *Mycobacterium tuberculosis* var. *hominis* (H37–RV) and 50-fold dilution gives 44% inhibition of *Aerobacter aerogenes*.

The incubated culture mixture is filtered and adjusted to pH7.12 with 2 N sulfuric acid and extracted with six quarter-volumes of n-butanol. The pH of the filtrate is adjusted to pH 7.1±0.1 before each extraction. The combined butanol extracts are concentrated to dryness in vacuo and the residue is taken up in 50 ml. of water. The resulting clear yellow aqueous solution contains 1.95 mg. of hygromycin per ml. This solution causes 50% inhibition of the growth of *Aerobacter aerogenes* at a dilution of 1:58 and it completely suppresses the growth of *Mycobacterium tuberculosis* var. *hominis* (H37–RV) at a dilution of 1:64. The product has a characteristic ultraviolet peak at a wave-length of 269 millimicrons in 0.1 N hydrochloric acid and in a phosphate buffer (pH 7). The product can be purified by adsorption and elution means employing a suitable column, such as in Example 1(*b*) or (*c*), and if desired the material thus obtained can be further purified by means of counter-current extraction, such as in Example 1(*d*).

EXAMPLE 3

2.5 liters of the following nutrient medium are prepared:

| | Percent (w./v.) |
|---|---|
| Glucose monohydrate | 0.5 |
| Glycerol | 0.5 |
| Acid hydrolyzed casein | 0.3 |
| Peptone | 0.25 |
| Brewers' yeast | 0.1 |
| Butanol-acetone fermentation residue | 0.25 |
| Corn steep solids | 0.25 |
| Expellers soybean oil meal | 0.25 |
| Sodium chloride | 0.5 |
| Calcium carbonate | 0.1 |

Water to make 2.5 liters.

The medium is placed in equal amounts in eight one-liter Erlenmeyer flasks which are then capped with gauze-covered cotton pads, and sterilized with steam at 18 lbs. pressure for 25 minutes. The post-sterilization pH is 6.2–6.3. Following sterilization, the medium in each of the flasks is inoculated with 1 ml. of a spore suspension obtained by suspending the spores from four sporulated Waksman's glucose-tryptone agar slants of *Streptomyces atrofaciens*, in 9 ml. of 0.01% sterile castile soap solution. The inoculated media are then incubated at 22–24° C. for 90 hours with aeration and agitation supplied by a Gump rotary shaker at 160 r.p.m. After 90 hours the media (pH 7.5) are filtered. The clarified beer thus obtained completely suppresses the growth of *Mycobacterium tuberculosis* var. *hominis* (H37–RV) at a dilution of 1:16.

Following incubation, the beers are combined, adjusted to pH 7.15, and extracted six times with quarter-volumes of n-butanol. The pH is adjusted to 7.1 before each extraction. The combined butanol extracts are concentrated to dryness in vacuo below 40° C. The residue is extracted with approximately 400 ml. of distilled water and the extracts are filtered to remove insoluble material. The filtrate is adjusted to pH 7.13 with 2 N sodium hydroxide and is dried from the frozen state. The product hygromycin has ultraviolet absorption peaks at wave-lengths of 273 millimicrons in 0.1 N hydrochloric acid and 270 millimicrons in pH 7 phosphate buffer. It causes 50% inhibition of the growth of *Aerobacter aerogenes* in a standard culture medium at a concentration of about 71 micrograms per ml. The product can be purified by adsorption and elution means such as in Example 1(*b*) or (*c*), and if desired the material thus obtained can be further purified by means of counter-current extraction, such as in Example 1(*d*).

EXAMPLE 4

250 ml. of the following nutrient medium is prepared:

| | Percent (w./v.) |
|---|---|
| Glucose monohydrate | 1 |
| Debittered brewers' yeast | 1 |
| Butanol-acetone fermentation residue | 0.5 |
| Sodium chloride | 0.5 |

Water to make 250 ml.

The medium is adjusted to pH 7 to 7.2 with 10 N sodium hydroxide solution and 0.1% calcium carbonate is added. 125 ml. of the medium is placed in each of two 500 ml. Erlenmeyer flasks which are then capped with gauze-covered cotton pads and are sterilized with steam at 18 lbs. pressure for 25 minutes. The post-sterilization pH is 6.5–6.7. Following sterilization the medium in each of the flasks is inoculated with 1 ml. of a spore suspension obtained by suspending the spores from a sporulated Anderson's agar slant of *Streptomyces atrofaciens*, in 9 ml. of 0.01% sterile castile soap solution. The inoculated media are then incubated at 22–24° C. for 90 hours with aeration and agitation supplied by a Gump rotary shaker at 160 r.p.m. After 90 hours, the media (pH 7.4) are combined and filtered. The clarified beer thus obtained completely suppresses the growth of *Mycobacterium tuberculosis* var. *hominis* (H37–RV) in a standard culture medium at a dilution of 1:32.

200 ml. of the filtered incubation media is adjusted to pH 7.05 with 2 N sulfuric acid and extracted with six quarter-volumes of n-butanol. The pH of the beer is adjusted to 7.1 before each extraction. The butanol extracts are combined and the solvent removed by concentration in vacuo at 40° C. The residue is extracted several times in 5–10 ml. portions of distilled water, the resulting slightly colored suspension is filtered and the filter cake is washed with 2 ml. of distilled water. The filtrates are combined and adjusted to pH 7.18 with 0.1 N sodium hydroxide. The resulting solution contains approximately 1.57 mg. of solids per ml. At a dilution of 1:88 this solution gives 50% inhibition of the growth of *Aerobacter aerogenes*; at a dilution of 1:64 it completely suppresses the growth of *Mycobacterium tuberculosis* var. *hominis* (H37–RV). The solution in 0.1 N hydrochloric acid has a characteristic ultraviolet absorption peak at a wave-length of 264 millimicrons. The product can be purified by adsorption and elution means, such as in Example 1(*b*) or (*c*), and if desired the material thus obtained can be further purified by means of counter-current extraction, such as in Example 1(*d*).

What we claim is:

1. Process for the production of hygromycin which comprises the steps of inoculating a sterile aqueous nutrient medium containing an assimilable carbon source, proteinaceous material and a mineral source with *Streptomyces atrofaciens* and incubating the inoculated medium at a temperature of about 20 to 35° C. under aerobic conditions.

2. Process for the production of hygromycin which comprises inoculating a sterile aqueous nutrient medium having a pH between 6 and 9 and containing an assimilable carbon source, proteinaceous material and a mineral source with *Streptomyces atrofaciens*, incubating the inoculated medium at a temperature of about 20 to 35° C. under aerobic conditions for about 3 to 6 days, and recovering the hygromycin so produced from the incubated medium.

3. In a process for producing hygromycin, the step which comprises cultivating *Streptomyces atrofaciens* under aerobic conditions in contact with a sterile nutrient medium at a suitable incubation temperature and for a suitable period of cultivation to form hygromycin in said medium.

4. Process for the production of hygromycin, which comprises cultivating *Streptomyces atrofaciens* under aerobic conditions at a temperature of 20 to 35° C. in the submerged state in a sterile aqueous nutrient medium having a pH between 6 and 9 and containing an assimilable carbon source, proteinaceous material and a mineral source.

5. Process for the production of hygromycin which comprises inoculating a sterile aqueous nutrient medium having a pH between 6.8 and 8.2 and containing an assimilable carbon source, proteinaceous material, and a mineral source with *Streptomyces atrofaciens*, incubating the inoculated medium at a temperature of 23 to 28° C. while agitating said inoculated medium and introducing sterile air therein so as to cause the *Streptomyces atrofaciens* to develop as discrete particles dispersed throughout said medium, and separating undissolved solid material from the liquid after said incubating step thereby obtaining an aqueous solution containing a high concentration of hygromycin.

6. The process according to claim 5 in which the nutrient medium comprises glucose, glycerol, casein, peptone, brewers' yeast, butanol-acetone fermentation residue, corn steep solids, soybean oil expeller meal, sodium chloride, and calcium carbonate.

7. In a process for obtaining hygromycin the method of producing a concentrate containing hygromycin from culture liquids containing a minor amount of the same, which comprises extracting said culture liquids with a water-immiscible organic solvent, separating the water-immiscible organic solvent phase from the aqueous phase, and removing the water-immiscible organic solvent from said organic solvent phase.

8. Hygromycin, an antibiotic produced by cultivating under aerobic conditions the Streptomyces strain NRRL 2429 in a culture medium containing mold-assimilable carbon, nitrogen and inorganic salts, until substantial antibiotic activity is produced by said Streptomyces strain in said culture medium, and recovering the hygromycin from said culture medium.

References Cited in the file of this patent

UNITED STATES PATENTS 2,653,899   Bunche et al. _____ Sept. 29, 1953

FOREIGN PATENTS 514,590   Canada _____ July 12, 1955

OTHER REFERENCES

Pittenger et al.: Antibiotics Annual, 1953–1954, pp. 157–173, pub. December 1953, by Medical Encyclopedia, Inc., New York City.

Mann et al.: Antibiotics and Chemotherapy, pp. 1279–1282, vol. 3, 1953.

Waksman: "Antinomycetes and their Antibiotics," pp. 9–20, 93–94, 168–184, pub. by Williams & Wilkins, Baltimore, Maryland, 1953.

Baldacci et al.: Archiv. für Mikrobiologie, Bd. 20, pp. 347–357, 1954.

Bergey's Manual of Determinative Bacteriology, pp. 47–48, pub. by Williams & Wilkins, Baltimore, Maryland, 1948.

Stevenson: Nature, pp. 598–599, Sept. 25, 1954.

Wright: Nature, May 12, 1956, p. 896.

Chem. and Eng. News, Oct. 1, 1956, p. 4756.